United States Patent
Thubert et al.

(10) Patent No.: US 10,757,647 B2
(45) Date of Patent: Aug. 25, 2020

(54) OPTIMIZED CHANNEL SELECTION FOR VIRTUAL ACCESS POINT (VAP) ENABLED NETWORKS

(71) Applicant: Cisco Technology, Inc., San Jose, CA (US)

(72) Inventors: Pascal Thubert, La Colle sur Loup (FR); Jean-Philippe Vasseur, Saint Martin d'uriage (FR); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 225 days.

(21) Appl. No.: 15/499,017

(22) Filed: Apr. 27, 2017

(65) Prior Publication Data
US 2018/0123963 A1   May 3, 2018

Related U.S. Application Data

(60) Provisional application No. 62/415,381, filed on Oct. 31, 2016.

(51) Int. Cl.
*H04W 48/20* (2009.01)
*H04W 28/02* (2009.01)
*H04L 29/08* (2006.01)

(52) U.S. Cl.
CPC ....... *H04W 48/20* (2013.01); *H04W 28/0263* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 9,210,534 B1 | 12/2015 | Matthieu et al. | |
| 9,405,591 B2 | 8/2016 | Bhanage et al. | |
| 9,503,466 B2 | 11/2016 | Vasseur et al. | |
| 2006/0019673 A1* | 1/2006 | Yagyu | H04W 72/08 455/454 |
| 2006/0094400 A1* | 5/2006 | Beachem | H04L 63/101 455/410 |

(Continued)

OTHER PUBLICATIONS

"LoRa Alliance™ Technology", https://www.lora-alliance.org/What-Is-LoRa/Technology, Accessed Jan. 4, 2017, 2 pages, LoRa Alliance.

(Continued)

*Primary Examiner* — Adnan Baig
(74) *Attorney, Agent, or Firm* — Behmke Innovation Group LLC; Kenneth J. Heywood; James J. Wong

(57) ABSTRACT

In one embodiment, a supervisory device in a network forms a virtual access point (VAP) for a node in the network. A plurality of access points (APs) in the network are mapped to the VAP as part of a VAP mapping and the node treats the APs in the VAP mapping as a single AP for purposes of communicating with the network. The supervisory device determines a traffic type of traffic associated with the node. The supervisory device assigns the node to a selected wireless channel based in part on the traffic type of the traffic associated with the node. The supervisory device controls the VAP to use the channel assigned to the node.

20 Claims, 17 Drawing Sheets

(56) References Cited

U.S. PATENT DOCUMENTS

| | | | |
|---|---|---|---|
| 2011/0122788 A1* | 5/2011 | Sombrutzki | H04W 16/10 |
| | | | 370/252 |
| 2014/0334471 A1* | 11/2014 | Chen | H04W 12/0808 |
| | | | 370/338 |
| 2015/0098459 A1 | 4/2015 | Lee et al. | |
| 2016/0044593 A1 | 2/2016 | Anpat et al. | |
| 2016/0072638 A1 | 3/2016 | Amer et al. | |
| 2016/0112917 A1 | 4/2016 | Bharghavan et al. | |
| 2016/0156673 A1 | 6/2016 | Emmanuel et al. | |
| 2016/0262163 A1 | 9/2016 | Gonzalez Garrido et al. | |
| 2016/0302063 A1* | 10/2016 | Ahmed | H04W 36/08 |
| 2016/0315808 A1 | 10/2016 | Saavedra | |
| 2016/0374078 A1 | 12/2016 | Ghosh et al. | |

OTHER PUBLICATIONS

"Virtual Access Point Software for Windows 7", http://www.virtualaccesspoint.com/, Accessed Jan. 4, 2017, 1 page, virtualaccesspoint.com.

"VirtualAPs", ArubaOS—Chapter 5, http://www.arubanetworks.com/techdocs/ArubaOS_61/ArubaOS_61_UG/VirtualAPs.php, Accessed Jan. 4, 2017, Arubanetworks.com.

"What Is a Virtual Access Point?", SonicOS 6.2—Administration Guide, https://documents.software.dell.com/sonicos/6.2/administrationguide/sonicpoint/configuring-virtual-access-points/sonicpoint-virtual-access-point/sonicpoint-vap-overview/what-is-a-virtual-access-point, 1 page, Aug. 26, 2016, Quest Software Inc.

Home—The Things Network Wiki; <https://www.thethingsnetwork.org/wiki/LoRaWAN/Homepages>; pp. 1-15.

\* cited by examiner

OPTIMIZED CHANNEL SELECTION FOR VIRTUAL ACCESS POINT (VAP) ENABLED NETWORKS

RELATED APPLICATION

This application claims priority to U.S. Provisional Patent Appl. No. 62/415,381, filed on Oct. 31, 2016, entitled OPTIMIZED CHANNEL SELECTION FOR VIRTUAL ACCESS POINT (VAP) ENABLED NETWORKS, by Thubert, et al., the contents of which are incorporated herein by reference.

TECHNICAL FIELD

The present disclosure relates generally to computer networks, and, more particularly, to optimized channel selection for virtual access point (VAP) enabled networks.

BACKGROUND

The Internet of Things (IoT) is the internetworking of devices or objects (a.k.a., "things", e.g., sensors, actuators, nodes, vehicles, etc.) that collect and exchange data, control objects, and process data. Many IoT networks are formed on low-power lossy networks (LLNs), and utilize carrier sense multiple access with collision avoidance (CSMA/CA) techniques. CSMA/CA, notably, is a communication technique that uses carrier sensing, where nodes attempt to avoid collisions by transmitting only when the channel is sensed to be "idle."

In general, deterministic routing concerns ensuring that messages (e.g., packets) definitively arrive at a destination at a specific time or within a specified time range. However, implementing determinism in hub-and-spoke IoT models, particularly with CSMA/CA, faces a litany of drawbacks, such as overwhelming a server with multiple copies of traffic, excessive delay, surges in latency, and unacceptable frame loss.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
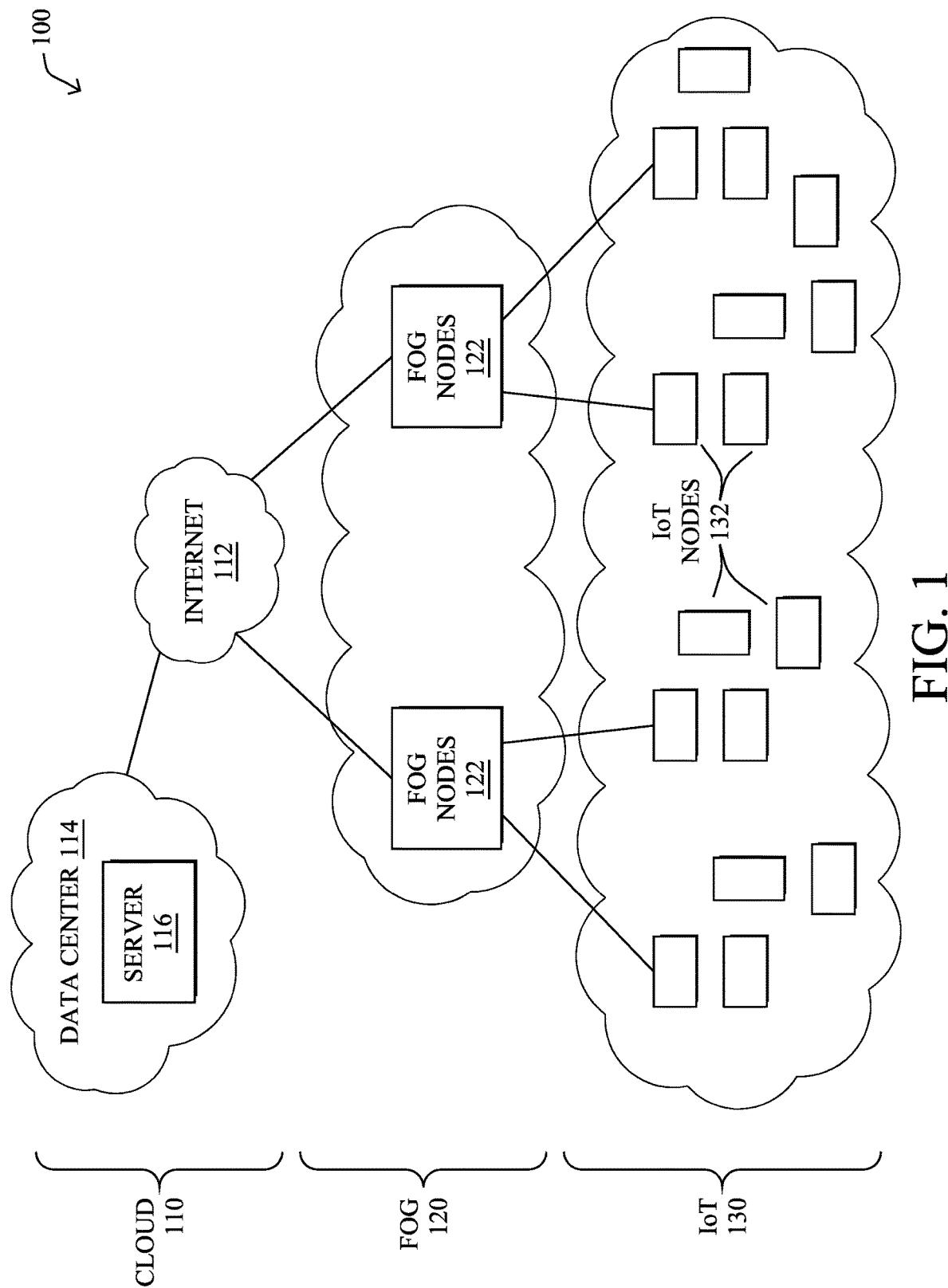
FIG. 1 illustrates an example communication network.

According to one or more embodiments of the disclosure, a supervisory device in a network forms a virtual access point (VAP) for a node in the network. A plurality of access points (APs) in the network are mapped to the VAP as part of a VAP mapping and the node treats the APs in the VAP mapping as a single AP for purposes of communicating with the network. The supervisory device determines a traffic type of traffic associated with the node. The supervisory device assigns the node to a selected wireless channel based in part on the traffic type of the traffic associated with the node. The supervisory device controls the VAP to use the channel assigned to the node.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
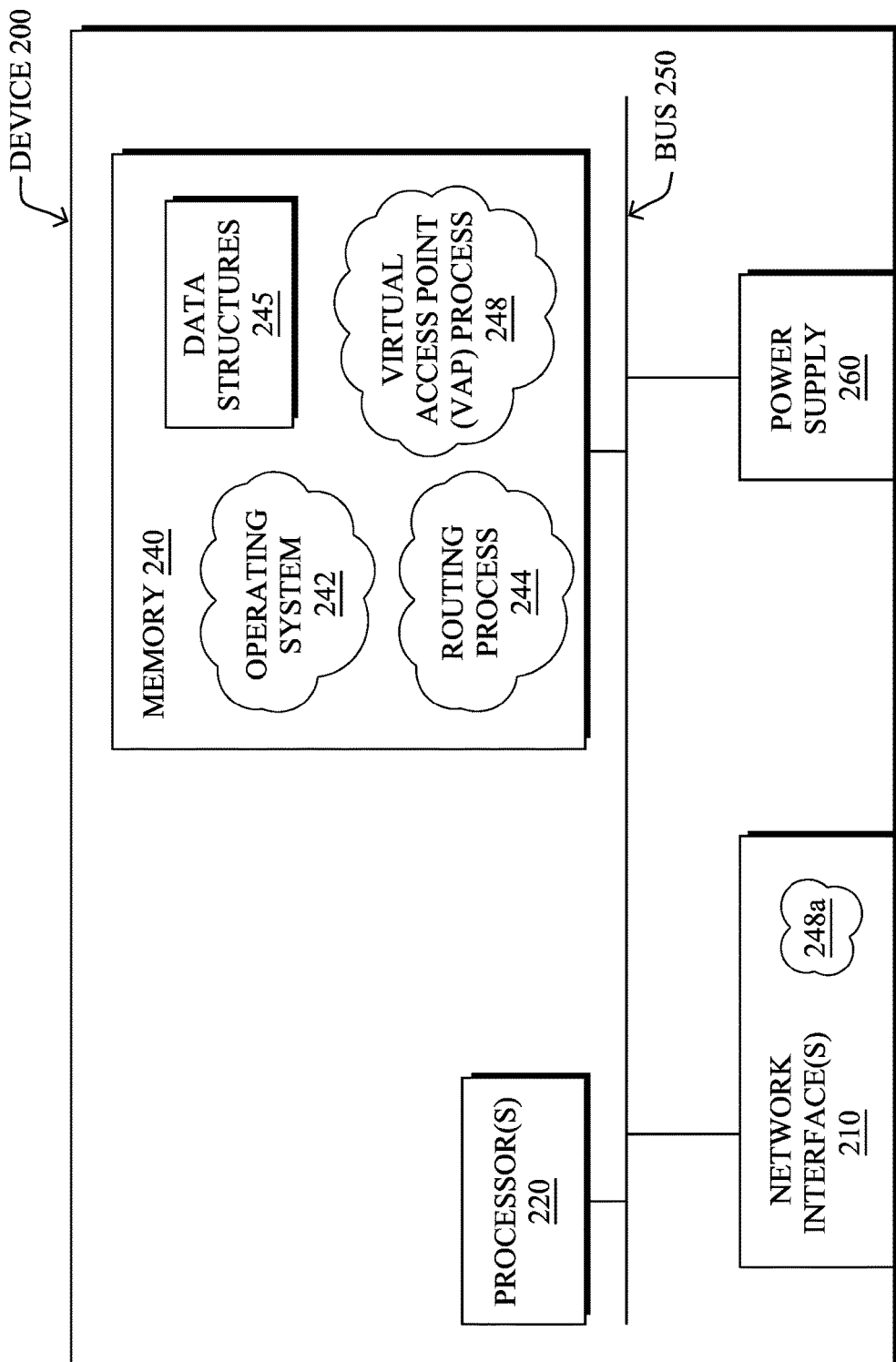
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative virtual access point (VAP) process 248, as described herein. Note that while VAP process 248 is shown in centralized memory 240, alternative embodiments provide for the process to be specifically operated within the network interfaces 210, such as a component of a MAC layer (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In general, VAP process 248 includes computer executable instructions that, when executed by processor(s) 220, cause device 200 to perform operations regarding the formation, adjustment, and operation of a VAP within the network. These operations are described in greater detail below. In some embodiments, process 248 may employ any number of machine learning techniques, to perform these operations. In general, machine learning is concerned with the design and the development of techniques that receive empirical data as input (e.g., data regarding the performance/characteristics of the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, process 248 can use the model M to classify new data points, such as information regarding the performance/characteristics associated with an established VAP or its underlying APs, to adjust the VAP, accordingly. Often, M is a statistical model, and the cost function is inversely proportional to the likelihood of M, given the input data.

In various embodiments, VAP process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample network data that may be labeled simply as representative of a "good connection" or a "bad connection." On the other end of the spectrum are unsupervised techniques that do not require a training set of labels. Notably, while a supervised learning model may look for previously seen network data that has been labeled accordingly, an unsupervised model may instead look to whether there are sudden changes in the performance of the network and/or the VAP. Semi-supervised learning models take a middle ground approach that uses a greatly reduced set of labeled training data.

Example machine learning techniques that process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly labeled a connection as bad. Conversely, the false negatives of the model may refer to the number of connections that the model labels as 'good,' but are, in fact, of poor quality to the user or endpoint node. True negatives and positives may refer to the number of times the model correctly classifies a connection as good or bad, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives. In some cases, process 248 may also use reinforcement learning techniques which generally act to use feedback about the ML predictions, to adjust the underlying model. For example, an indication of a false positive from an expert (e.g., a supervisory system or user) may be used to adjust the underlying model, to avoid such predictive mistakes in the future.

As mentioned above, various protocols have been established for the IoT, including, in particular, various "hub-and-spoke" models, such as Bluetooth Low Energy, DECT-Ultra Low Energy, IEEE 802.15.4 (with no meshing), and Low Power Wi-Fi. However, there is also a lack of determinism in these models due to prevalent use of carrier sense multiple access with collision avoidance (CSMA/CA) for wireless communications. Notably, deterministic networking requires that the worst-case data loss and latency should be guaranteed in a consistent fashion as multiple services are deployed on a common converged network infrastructure. This determinism is key to many applications, such as safety and process control. To complicate matters further, considering the vast amounts of devices that are currently being installed in various IoT networks, an important constraint to be placed on any solution is that changes at the end device (e.g., IoT device/thing) should not be necessary. This would also enable connection of legacy devices, thereby addressing a much wider market of applicability.

Virtual Access Point (VAP) Formation

The techniques herein introduce a methodology that can be used with existing IoT infrastructure to implement a virtual access point (VAP) that is unique to a given IoT node. In general, the VAP is a logical entity that appears to the endpoint node as a normal AP to which the node associates as normal. In practice, however, the VAP is physically distributed over a number of APs surrounding the device. In another aspect, a supervisory device in the network may control the AP membership in the VAP, such as by transferring AP membership in the network while the node moves and without requiring the node to roam. In further aspects, a machine learning model of the supervisory device may oversee the VAP and adjust the VAP mapping, accordingly. Such a machine learning model may reside in the supervisory device (e.g., controller, cloud service, etc.) in a centralized mode, or in a distributed manner across the APs. Depending on the traffic criticality, more or less of those APs may copy a given frame received from the endpoint node to the supervisory device.

Illustratively, the techniques described herein may be performed by hardware, software, and/or firmware, such as in accordance with virtual access point process 248, which may include computer executable instructions executed by processor 220 (or independent processor of interfaces 210) to perform functions relating to the techniques described herein. In particular, VAP process 248 may be a component of an IoT device, a cloud device, or any other participating device for the techniques described herein.

Specifically, according to one or more embodiments of the disclosure, a supervisory device in a network receives from a plurality of APs in the network data regarding a network availability request broadcast by a node seeking to access the network and received by the APs in the plurality. The supervisory device uniquely associates the node with a VAP for the node and forms a VAP mapping between the VAP for the node and a set of the APs in the plurality selected based on the received data regarding the network availability request. One of the APs in the mapping is designated as a primary access point for the node. The supervisory device instructs the primary AP to send a network availability response to the node that includes information for the VAP. The node uses the information for the VAP to access the network via the set of APs in the VAP mapping.

Operationally, the techniques herein specify an architecture and protocol between a supervisory device in a network (e.g., a controller, such as a network server) and a plurality of network access points (APs). The supervisory device may be configured for use with any of the technologies, noted above. Note that the techniques herein illustratively place a number of functions in the supervisory device, such as components hosting Machine Learning (ML) processes, also referred to as "learning machines") that are mostly technology-independent. In some embodiments, these processes may be implemented in a distributed manner (e.g., across different APs), in which case the collective set of APs may be viewed as the supervisory device.

More specifically, the techniques herein enable the formation and use of a VAP that appears to always be "near" an endpoint node, so that quality of transmission and PHY speed can be maintained. A VAP may be instantiated within a set of APs around the node, and the set may vary automatically under the control of the supervisory device (e.g., a controller hosting a machine learning model) within the infrastructure. Thus, the device never needs to make a decision of roaming, which is a paradigm change in Wi-Fi and other wireless networks. Also, since multiple APs can receive a same packet at a same time with unrelated probabilities, the overall chances of reception are increased and delays related to retries are reduced, thus helping with determinism.

Generally, a VAP may include any number of physical APs in the network that are placed in groups of equivalence, all using the same channel and security settings. When a node (e.g., a STA) associates with the network, the supervisory device (e.g., controller) may select a set of APs that together form a VAP for the associated node. The set may be changed as the node moves. In this way, the endpoint node may experience a constant service from the network and does not roam. For joining, the node may interact with one of the APs (e.g., a primary networking AP) and may use a unique network identifier associated with the VAP, such as a unique service set identifier (SSID), a PAN-ID, or the like, that the node uses to access the network. The supervisory device may also optimize the set of APs based on an objective function and on the observed traffic in the network. Diversity is obtained because multiple members of the VAP may receive the same packet from the node, with relatively independent chances of success.

The illustrative VAP protocol described herein also integrates well with deterministic networking (DetNet). In particular, the VAP protocol enables multiple APs to receive a packet from an endpoint node at the same time, creating a natural replication mechanism in which multiple copies of a same packet may be captured, each by a different AP participating in the VAP assigned to the node. Those APs may be connected over different networks and the packet may circulate to the router or the final destination over segregated paths. DetNet elimination may then be used to eliminate duplicate copies, if any. The VAP protocol herein also leverages various networking techniques (e.g., Wi-Fi, controllers, ML processes, etc.), to improve the user experience while maintaining compatibility with the existing network standards and existing endpoint nodes, by creating a virtual AP that is always there and always optimized so the node never tries to roam.

Figure 3A:
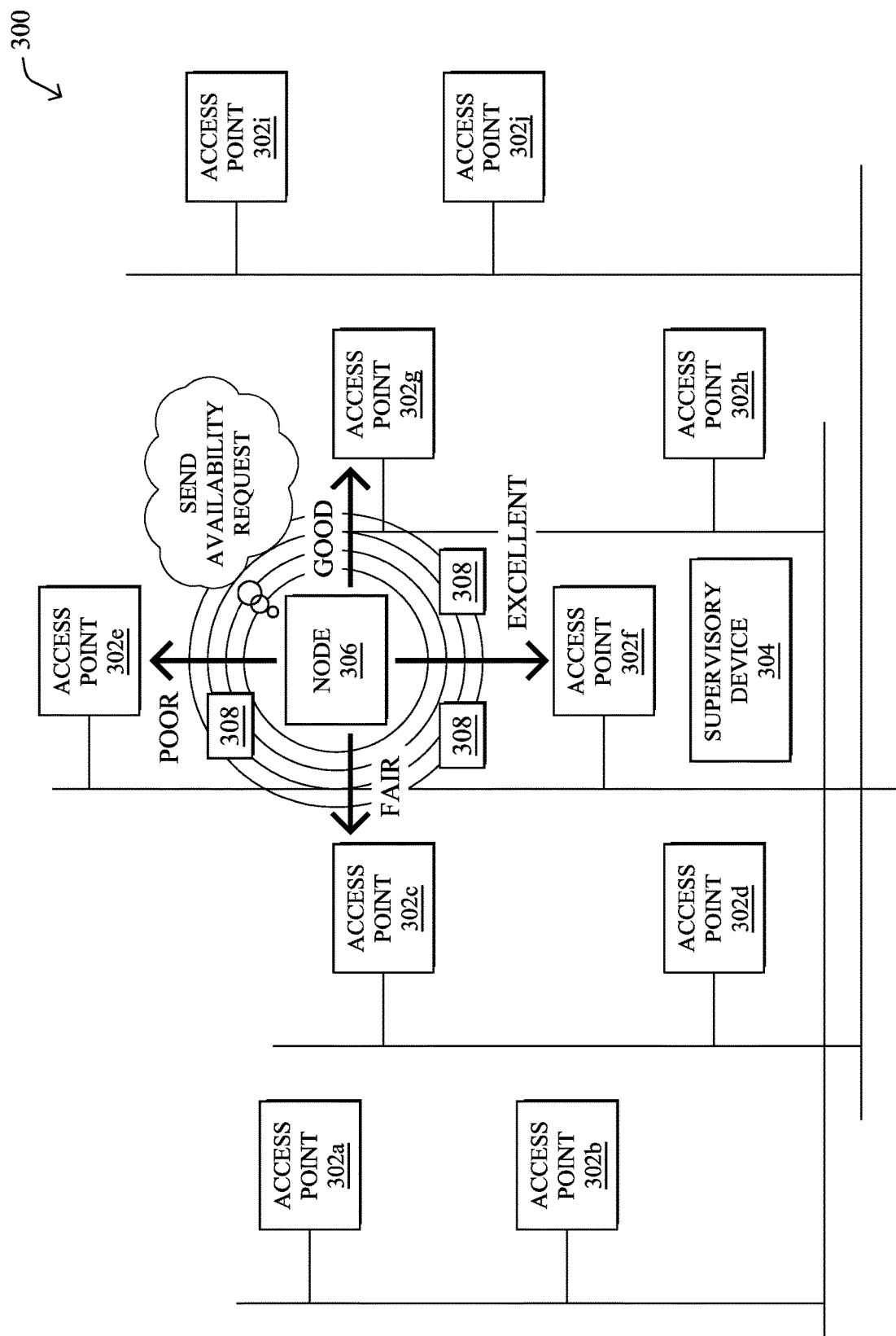
FIGS. 3A-3D illustrate an example of virtual access point (VAP) formation.

FIGS. 3A-3D illustrate an example of virtual access point (VAP) formation, according to various embodiments. As shown in FIG. 3A, assume that there exists a portion 300 of a network that includes a plurality of APs 302 (e.g., APs 302a-302j) that are located in different physical locations through an area (e.g., a building, campus, etc.). APs 302 may be in communication with a supervisory device 304 in the network, such as a wireless controller, other networking device, or, alternatively, a remote device, such as a server located in a data center or cloud computing environment.

Now, assume that a node 306 is attempting to access the network. In such a case, node 306 may broadcast a network availability request 308. The specific format of request 308 may be a function of the specific wireless protocols in use by the network. For example, in the case of 802.11 networks, availability request 308 may be a probe request. As would be appreciated, from the standpoint of node 306, the expected availability response would include an identifier for the available network, such as the SSID of the Wi-Fi network. Reception of availability request 308 by any of APs 302 may trigger the formation of a VAP for node 306, in various embodiments. In further embodiments, a VAP may also be formed at any time after node 306 associates with the network.

In many network implementations, a plurality of APs 302 may receive the broadcast network availability request 308 from node 306, with varying results. Notably, APs 302 within range of node 306 may, by virtue of receiving request 308, capture data regarding request 308, including the contents of request 308 and other characteristics of the received request 308 such as, but not limited to, a link quality indicator (LQI), a signal to noise ratio (SNR), or received signal strength indicator (RSSI), or the like. For example, as shown, AP 302f, which is physically located closest to node 306, may determine that the quality of the received request 308 is "excellent." Similarly, APs 302g, 302c, and 302e may determine that the quality of the received request 308 is "good," "fair," and "poor," respectively.

Figure 3B:
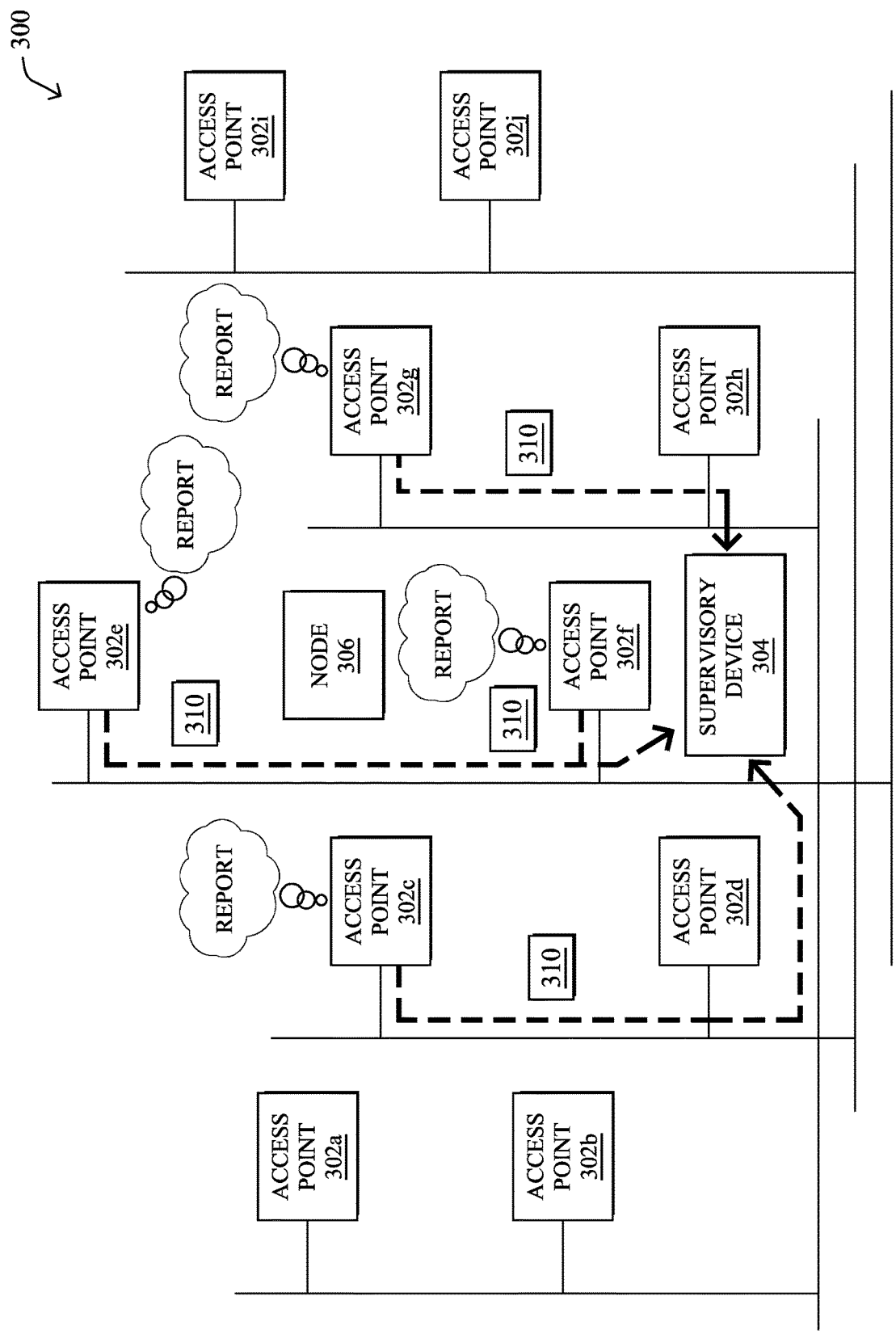

In various embodiments, rather than simply responding to request 308 with the requisite information needed for node 306 to associate with the network, the receiving APs 302 may instead report the captured data regarding request 308 to supervisory device 304. In particular, as shown in FIG. 3B, APs 302c, 302e, 302f, and 302g may send the data 310 regarding the received network availability request 308 from node 306 to supervisory device 304, thereby triggering the formation of a VAP for node 306. Data 310 may include, for example, the identity of the sending AP 302 that received request 308, a MAC address or other networking device identifier for node 306, security status information, and/or at least one metric of the quality of the communication with the node (e.g., signal strength, signal to noise ratio, signal quality, etc.).

Figure 3C:
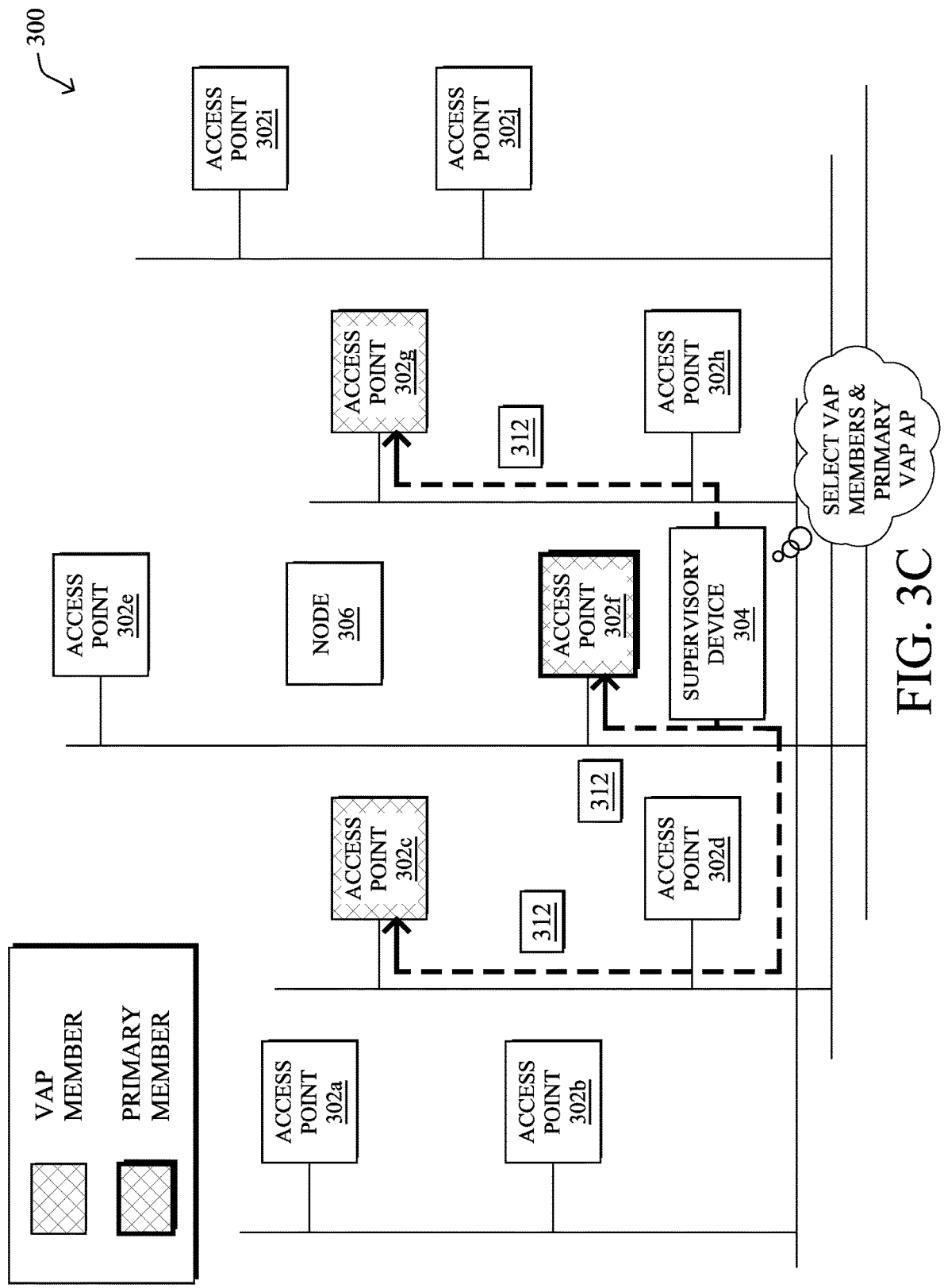

In FIG. 3C, the supervisory device 304 may create a virtual AP (VAP) that is unique to node 306. In general, the VAP may be mapped to any number of APs 306 selected by supervisory device 304 based in part on the data 310 regarding the availability request 308 received by the various APs 302. In other words, the VAP may be a logical construct that is distributed over multiple APs 302. For example, even though APs 302c, 302e, 302f, and 302g received association request 308 from node 306, supervisory device 306 may determine that the set of APs 302 in the VAP mapping for node 306 should only include APs 302c, 302f, and 302g, based on the quality of the received request 308 (e.g., AP 302e may be excluded from the VAP based on the poor quality of the received broadcast signal).

In addition to selecting the VAP member APs 302, supervisory device 304 may also designate one of the selected APs 302 as the primary AP 302 for the VAP. For example, based on data 310 regarding the availability request 308 sent by node 306, supervisory device 304 may determine that AP 302f has the best signal quality and should be the primary AP within the VAP for node 306. In turn, as shown in FIG. 3C, supervisory device 304 may send instructions 312 to the selected APs 302c, 302f, and 302g that include information regarding the VAP. For example, instructions 312 may instruct the selected APs 302c, 302f, and 302g to belong to the VAP for node 306, as identified initially by MAC address of node 306 and, as soon as it is available, by security token, and/or other cryptographic methods.

To implement the VAP in the network, supervisory device 304 may employ a VAP protocol, in order to exchange configuration and data packets with the APs 302. This protocol may be seen as an extension to existing protocols, such as Lightweight Access Point Protocol (LWAPP) and Control and Provisioning of Wireless Access Points (CAPWAP), or may be specified as a new protocol. For example, the exchanges of data 310 and instructions 312 may use this VAP protocol.

Figure 3D:
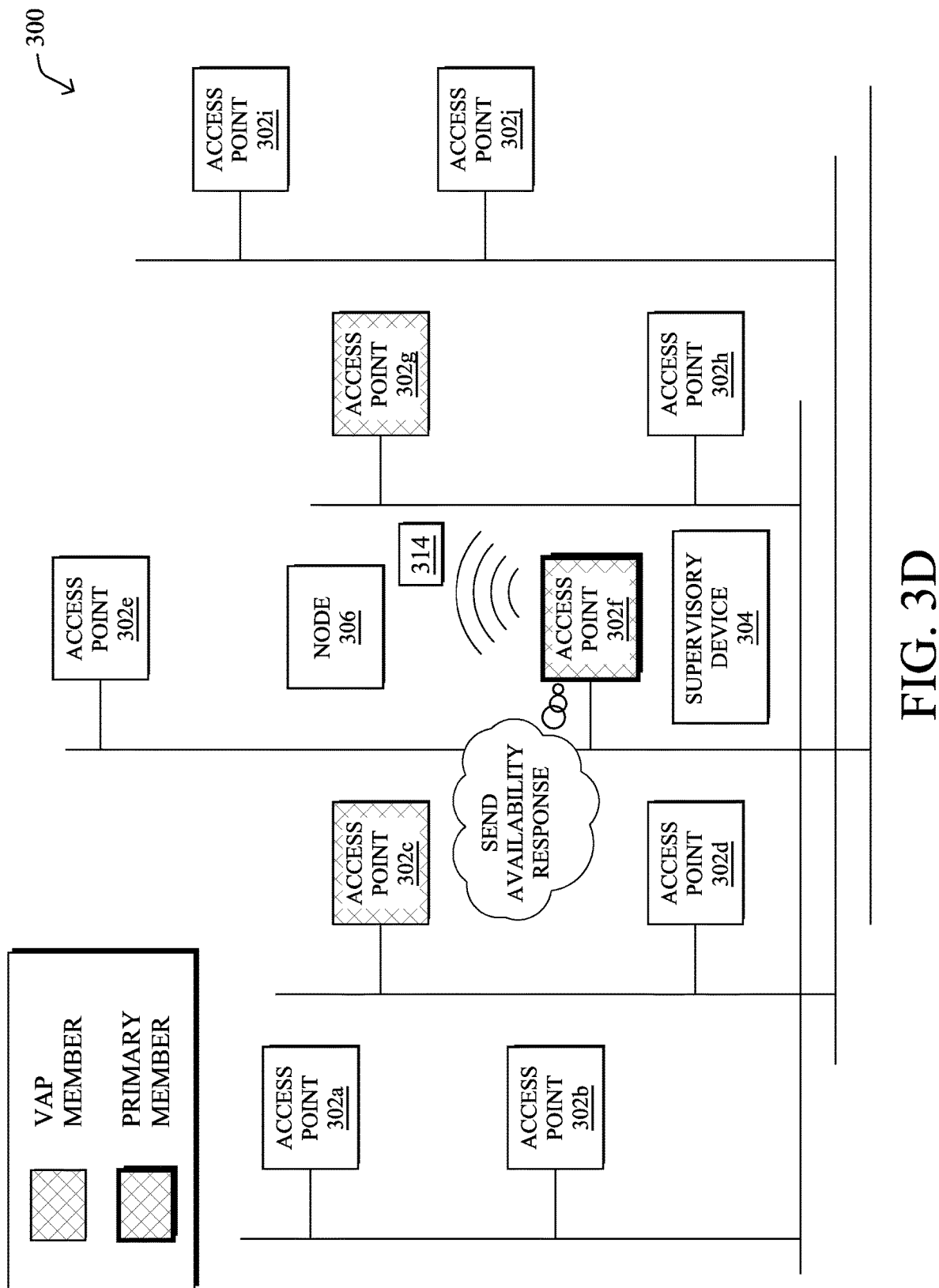

As shown in FIG. 3D, once the VAP has been generated and APs 302c, 302f, and 302g selected for mapping to the VAP, the primary AP 302f may send a network availability response 314 back to node 306. For example, response 314 may be a unicast probe response that has the same information as a beacon frame. In various embodiments, response 314 sent by primary AP 302f to node 306 may also include a unique network identifier associated with the VAP. For example, response 314 may include an SSID or PAN-ID generated by supervisory device 304 specifically for use with the VAP. In turn, node 306 may use the received response 314 to associate with the network, as it would under normal conditions. From the standpoint of node 306, it is associating with the network normally via AP 302f and may remain unaware of the existence of its associated VAP.

Figure 4A:
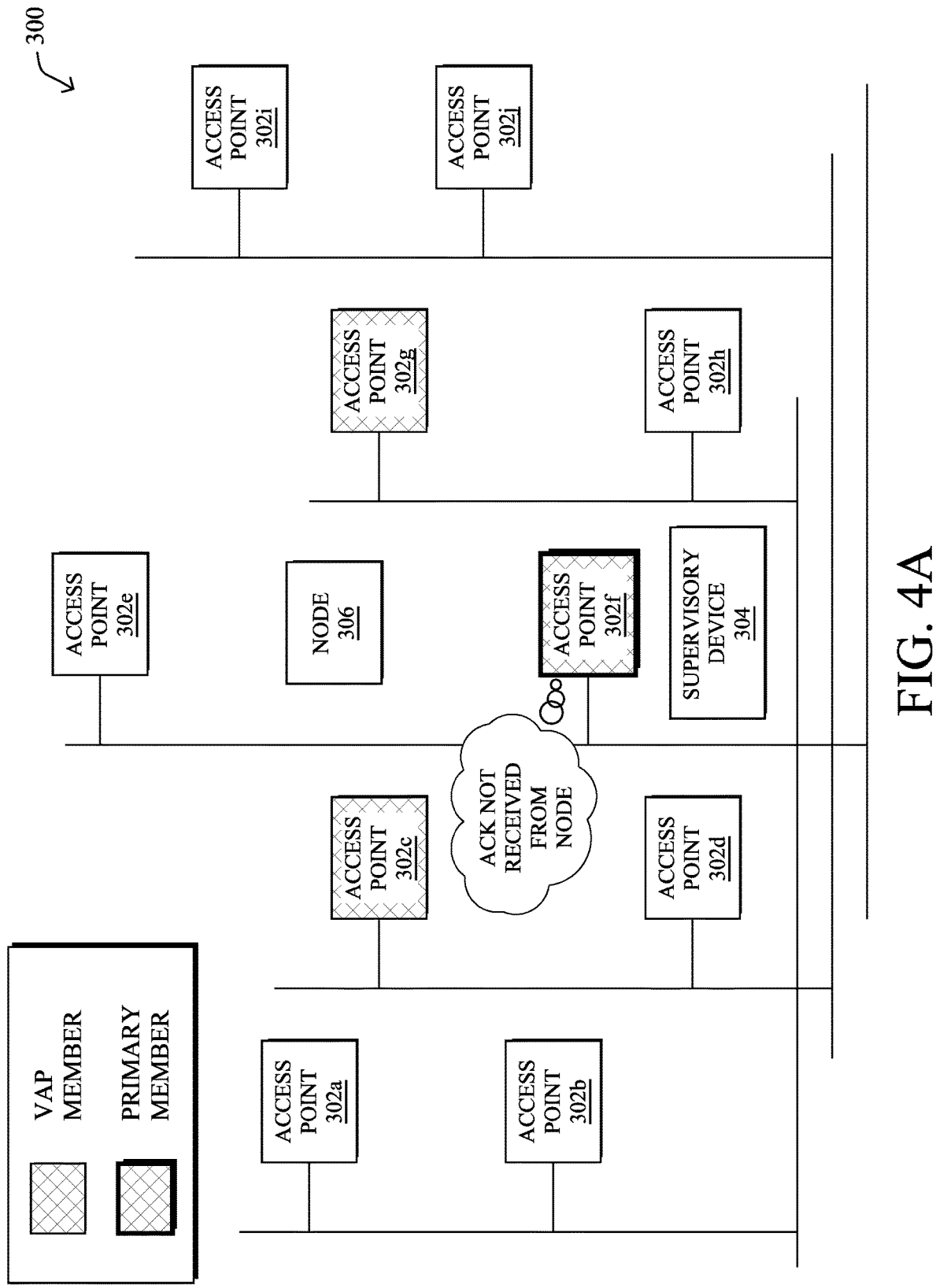
FIGS. 4A-4B illustrate an example of the operation of a VAP.
Figure 4B:
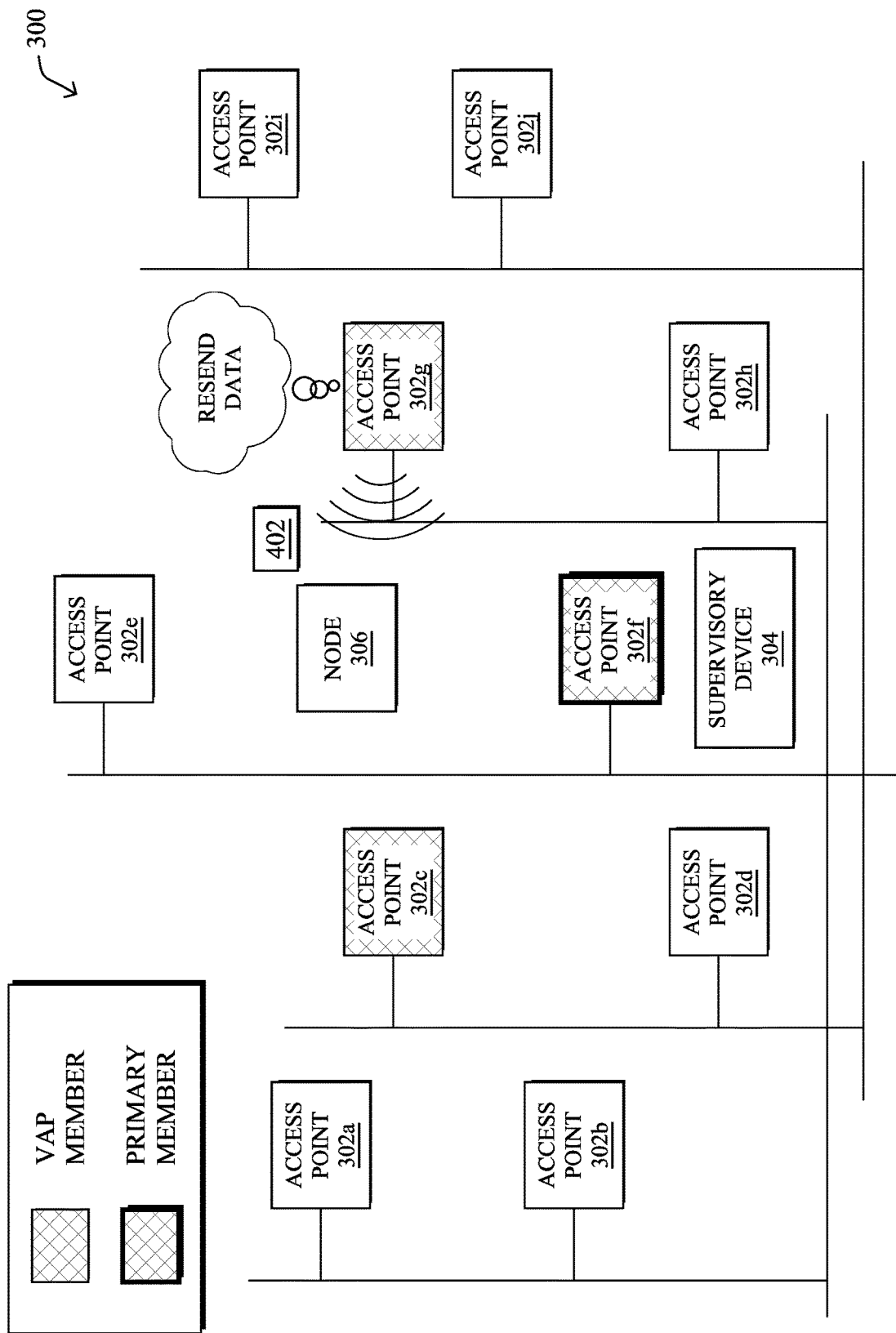

FIGS. 4A-4B illustrate an example of the operation of a VAP after formation, according to various embodiments. Continuing the examples of FIGS. 3A-3D, when forming the VAP for node 306, supervisory device 304 may also build an ordered list of the other APs 302 in the VAP mapping and conveyed to the selected APs 302 via instructions 312. In general, the ordered list may be used to add special diversity and improve the chances of a successful reception versus a retry from a given AP 302 that has already failed once. For example, as shown in FIG. 4A, assume that primary AP 302f has sent a message to node 306, but that message has not been acknowledged by node 306. Under normal circumstances, AP 302f would then attempt to retry sending the message again to node 306. However, according to various embodiments, as shown in FIG. 4B, AP 306g may instead resend the message 402 to node 306. Because the resend is sent from a different AP, the added spatial diversity increases the chances that the resent message 402 is received and acknowledged by node 306.

In various embodiments, learning machines may play a key role in the assignment of APs to a VAP and/or in the adjustment of an existing VAP. For example, such a learning machine may be trained to select APs 302 for inclusion in a given VAP based on a location estimation for the corresponding node (e.g., from data 310) and/or the desired optimization for the traffic expected from that type of node. For example, the location of node 306 may be derived from a Time Difference of Arrival value (TDOA or DTOA) and/or using triangulation between different APs 302.

Such a traffic optimization may be based on a history of traffic for the type of node, in some cases. As would be appreciated, the type of approach taken by the learning machine(s) may also vary with the specific objective function for the traffic and node type. For example, assume that node 306 is a particular type of telepresence device and that video traffic from similar devices has required a certain degree of network performance (e.g., in terms of drops, delay, jitter, etc.). In such a case, the learning machine may use its model for this node type, as well as any necessary metrics from the APs 302 in the network, to select an appropriate VAP mapping to satisfy the objective function.

Note that the objective function will also dramatically influence the set of metrics to be gathered from APs after the scanning phase but also during the lifetime of a VAP. Indeed, according to the objective function, the set of required features, in machine learning terms, may vary, and the frequency of AP selection for the VAP will also vary.

Figure 5A:
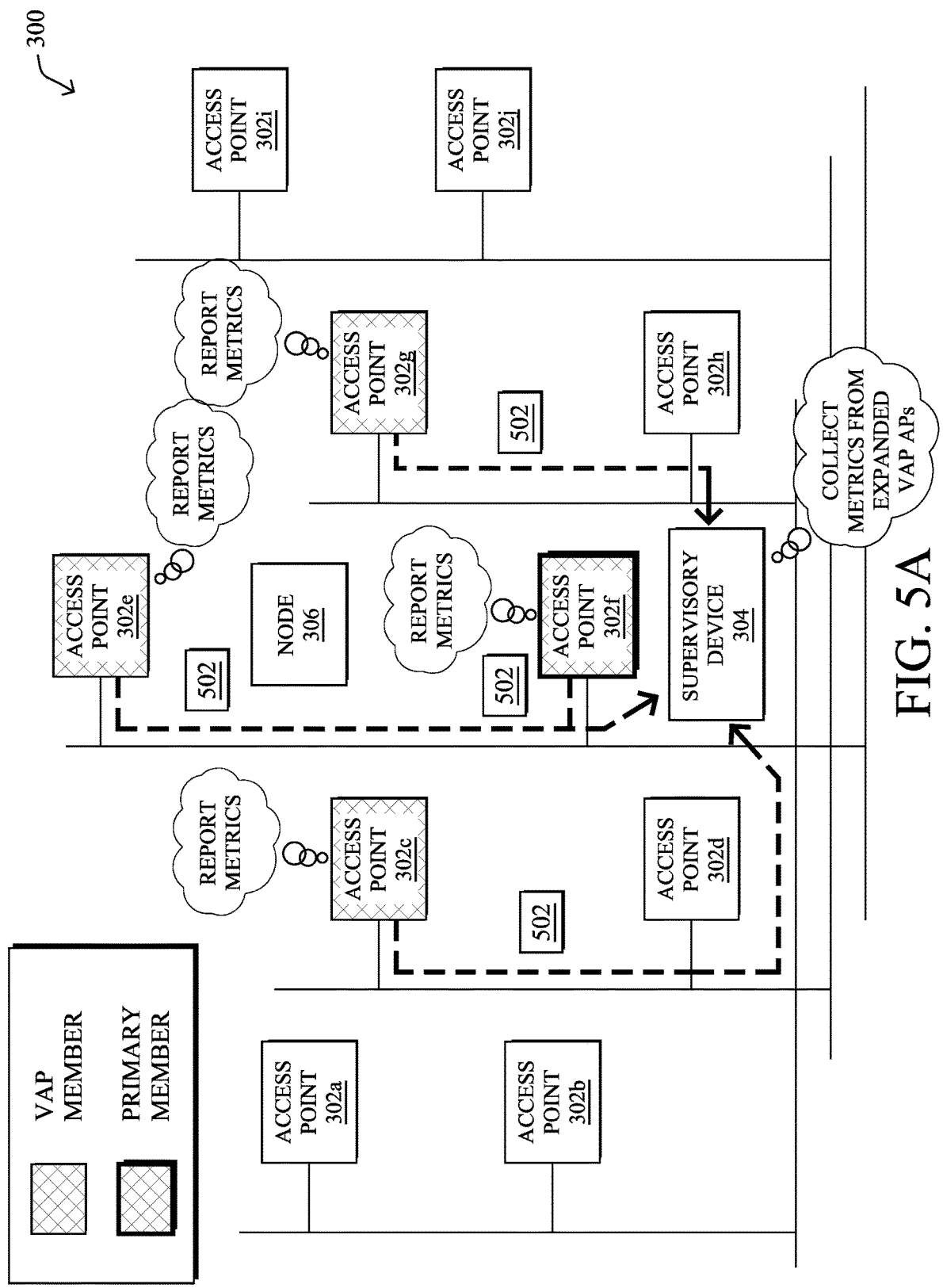
FIGS. 5A-5C illustrate an example of adjusting a VAP mapping.
Figure 5B:
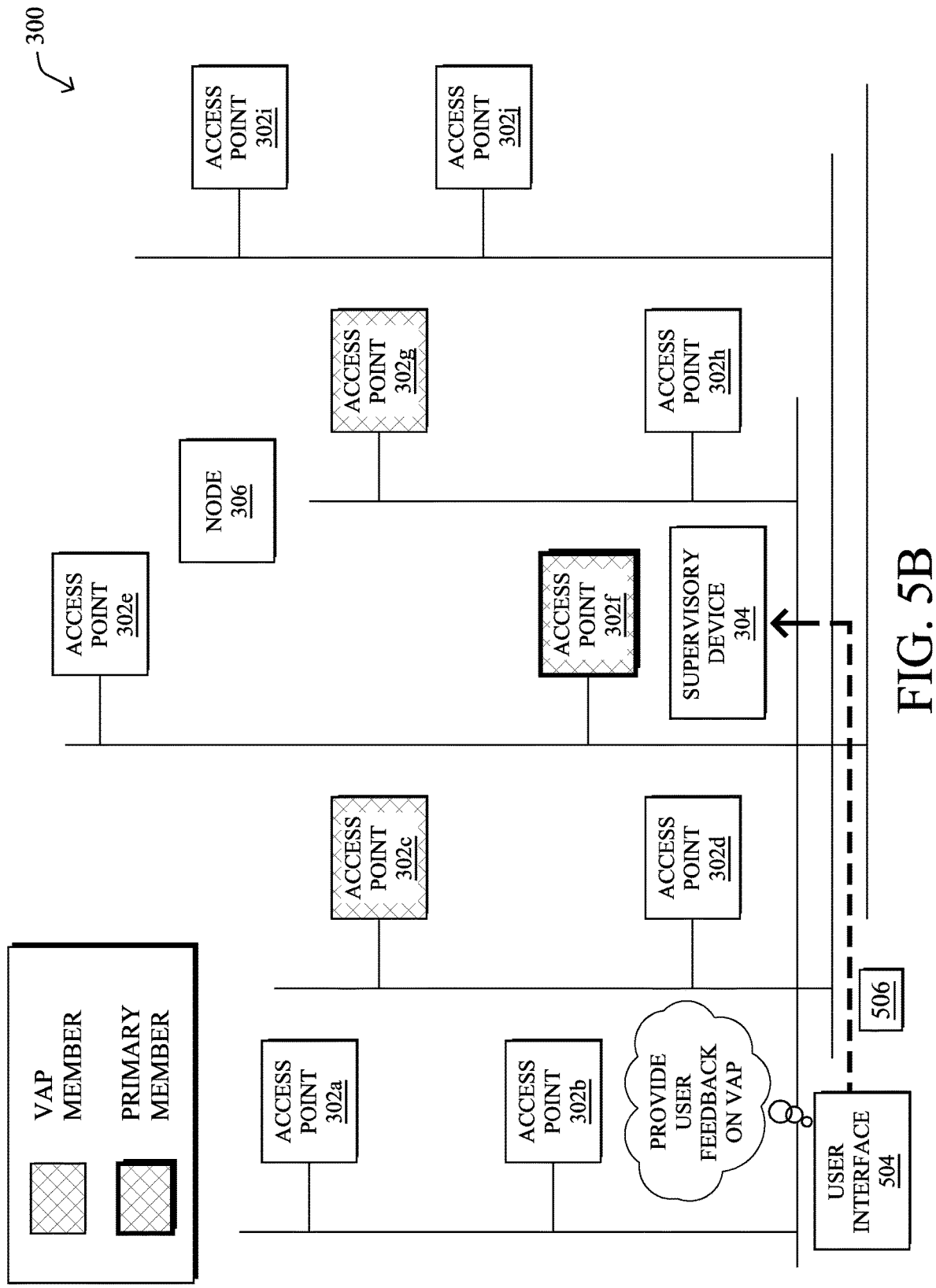
Figure 5C:
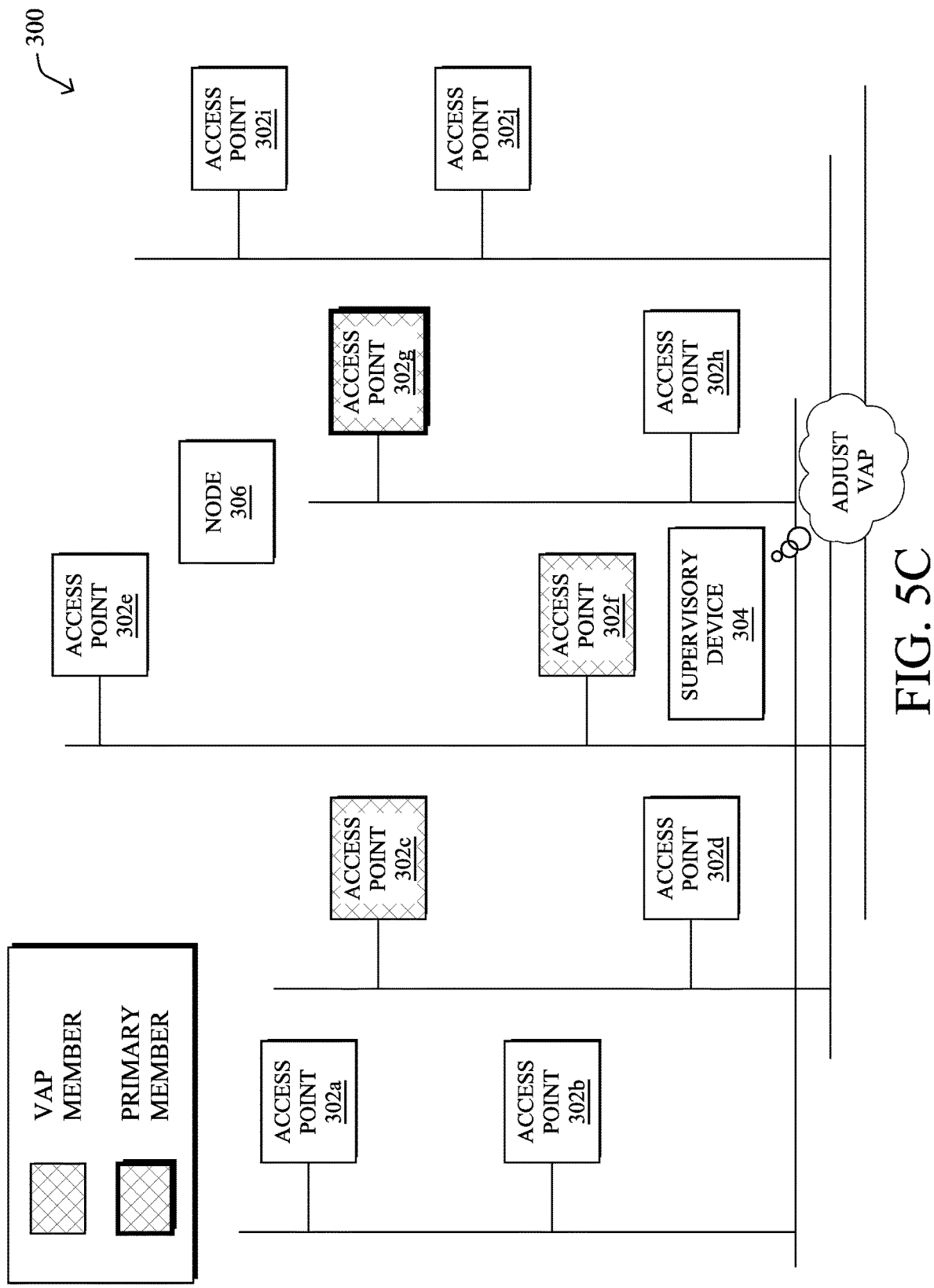

FIGS. 5A-5C illustrate an example of adjusting a VAP mapping, according to various embodiments. Even after formation of a VAP for a given node, supervisory device 304 may continue to monitor and adjust the VAP, in order to ensure that the objective function of the corresponding machine learning model for node 306 continues to be met. To do so, the following message types are introduced herein as part of the VAP protocol:

1.) VAP commands sent by the learning machine to APs 302, to gather metrics of interest (e.g., network characteristics/statistics), report the VAP group membership, etc.

2.) VAP metrics sent by the responding APs 302 to the learning machine and used by the objective function to compute the VAP membership (e.g., based on signal/noise ratio, signal strength, etc.).

3.) VAP stats reports sent by APs 302 to the learning machine and used to evaluate the VAP efficiency. Such stats reports may be used to gather statistical data used by the learning machine to determine the "efficiency" of the VAP group, which can be used by the learning machine to consistently adjust the VAP according to an objective function.

4.) Learning machine stats sent by learning machine to a user interface, to report objective function efficiency results.

In various embodiments, for purposes of collecting network metrics/characteristics and VAP stats from APs 302, supervisory device 304 may occasionally increase or otherwise adjust the APs in the VAP mapping. For example, as shown in FIG. 5A, supervisory device 304 may include AP 302e in the VAP mapping for purposes of data collection after formation of the VAP (e.g., via an instruction 312, even though AP 302e was not included in the original VAP mapping. This allows AP 302e to collect and report information that would not otherwise be possible using the original APs of the VAP. For example, by changing the set of APs, the learning machine can change the TDOA listeners and optimize the distance estimation, e.g., by adding APs while doing a measure, or triangulating between different sets of APs. Such collected information 502 may be reported to supervisory device 304, either on a push or pull basis. After the data collection, supervisory device 304 may opt to revert the VAP mapping back to its previous membership or make further adjustments to the AP memberships, accordingly.

As shown in FIG. 5B, supervisory device 304 may also convey data regarding the performance of the VAP (e.g., the objective function, etc.) to a user interface 504 for review by a user. In some embodiments, the learning machine may also use reinforcement learning to adjust its model for node 306 and make changes to the VAP mapping, accordingly. In such a case, the user of interface 504 (e.g., an admin device, etc.) may provide feedback 506 to the learning machine about the VAP efficiency, which is then used by the LM to adjust the strategy adopted to compute the VAP mapping.

Based on the captured network characteristics from the APs, the performance statistics for the VAP itself, and/or user feedback, the machine learning process may adjust the VAP by changing the APs in the VAP mapping. For example, as shown in FIG. 5C, assume that node 506 has move to a new physical location and is now in closer proximity to APs 302e and 302g. In such a case, supervisory device 504 may select a new set of APs 302 for the VAP of node 306 and send out corresponding instructions to the APs. Notably, as shown, supervisory device 304 may select a new set of APs for the VAP of node 306 that includes APs 302e, 302f, and 302g, with 302g now designated as the primary AP.

Thus, the generated VAP may add spatial diversity to any CSMA/CA LLN, in a manner somewhat akin to that of the LoRa model. However, in contrast to the techniques herein, LoRa uses different MAC operations and does not support the faster speeds of the components (e.g., PHY) used in today's IoT network devices. Additionally, LoRa does not support the association process, the use of identities (e.g., PAN-ID or SSID), and the automatic repeat request (ARQ) process for acknowledgement and retry, which are supported using the techniques herein. Further, LoRa does not support multicast communications, either.

Optimized Channel Selection in a VAP-Enabled Network

Fluctuations in the radio quality and concurrent accesses to the medium impact the observed quality by forcing the AP to degrade the transmission rate or wait to access the medium. From the user perspective, the quality of the link varies widely within short windows of time. In short, the experienced quality lacks determinism, which as mentioned above, would enable new IoT use cases for in CSMA/CA operations (e.g., LP-WiFi, 802.15.4, DECT-ULE, and BTLE).

A device that joins a particular channel has little visibility on the channel occupancy versus other potential channels, and whether this particular channel will be the best for its constraints, depending on the flows from other occupants. For instance, some jittery media flow from device A may inject huge frames asynchronously, that would be too detrimental to an IoT control flow from device B, and those two flows should never co-exist on a same channel. But selecting the right channel when multiple ones are available is almost impossible from the narrow standpoint of an IoT device.

Speed adaptation mechanisms (e.g., that minimize the harmful influence between flows that co-exist on a same channel, while optimizing the deterministic service for critical flows) may reach a point where this is not enough and flows should be distributed intelligently across channels so that critical applications are preserved.

In contrast, the techniques herein add an arrangement where feedback from control applications and learning machines are used to manage channel assignment per node, so as to protect the critical flows and optimize the quality of service for the less critical flows.

Said differently, according to the techniques herein, channels are dedicated for types of traffic, e.g. by policy or selected by learning machines (LM). Unique SSIDs are given to each STA. By moving the SSID to VAPs that are on different frequencies, the techniques herein allow control of which devices coexist on a same channel. The LM controls which device talks on which frequency. In a more capable embodiment, learning machines, that are continuously trained from feedback operations technology (OT) applications, optimize the coexistence of heterogeneous devices on a same channel so as to minimize harmful interferences.

Illustratively, the techniques described herein may be performed by hardware, software, and/or firmware, such as in accordance with virtual access point process 248, which may include computer executable instructions executed by processor 220 (or independent processor of interfaces 210) to perform functions relating to the techniques described herein. In particular, VAP process 248 may be a component of an IoT device, a cloud device, or any other participating device for the techniques described herein.

Specifically, in various embodiments, a supervisory device in a network forms a virtual access point (VAP) for a node in the network. A plurality of access points (APs) in the network are mapped to the VAP as part of a VAP mapping and the node treats the APs in the VAP mapping as a single AP for purposes of communicating with the network. The supervisory device determines a traffic type of traffic associated with the node. The supervisory device assigns the node to a selected wireless channel based in part on the traffic type of the traffic associated with the node. The supervisory device controls the VAP to use the channel assigned to the node.

Operationally, the techniques herein apply to an environment such as a VAP-enabled network (described above) as well as LoRa networks in general, which at some point may require the improvements described below. The embodiments herein generally consider the case of a VAPP-enabled LLN for describing one particular embodiment, though other embodiments may be understood by those skilled in the art. Also, as done above, the Wi-Fi parlance of an "AP," is not limited to Wi-Fi implementations and more generally refers to any transceiver in a network that provides access to the network.

Figure 6A:
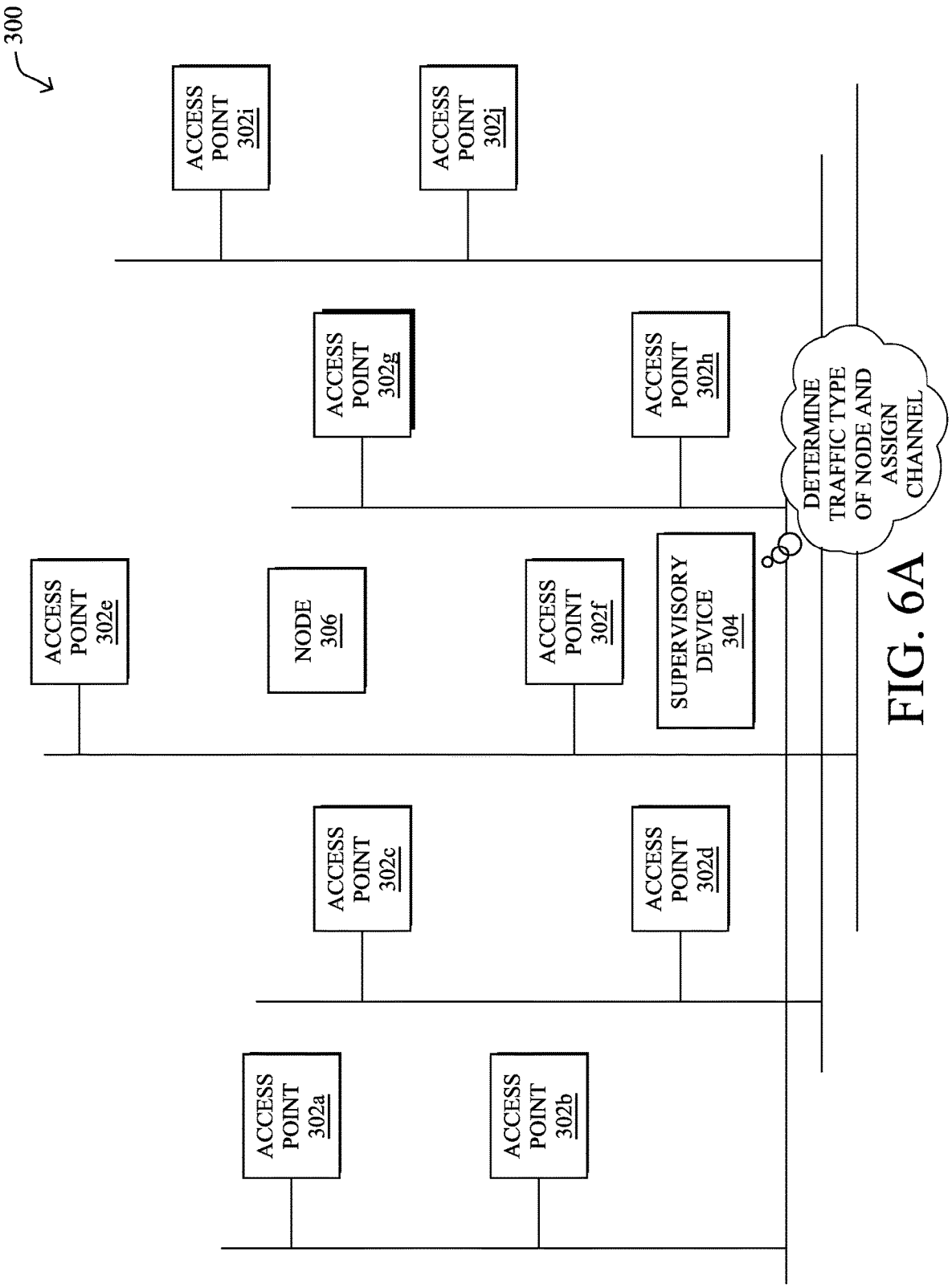
FIGS. 6A-6B illustrate an example of assigning a VAP channel to a node based on the traffic of the node.

A first component of the techniques herein relates to determining traffic type generated by a given node. For example, as shown in FIG. 6A, supervisory device 304 may determine a traffic type for the traffic associated with node 306. Such a determination may be performed when node 306 first joins the network, after joining the network, or a combination thereof.

In one embodiment, the traffic type determination may be made by the Learning Machine (LM) upon detecting a new node. For example, when node 306 joins the network, supervisory device 304 may operate in conjunction with a policy server or security engine (e.g., an identity service engine, an access control service, etc.), to identify the nature of node 306 and deduce the type of traffic that will potentially be observed with respect to node 306. For example, if node 306 is identified as a security camera, its corresponding traffic may be expected to be video stream traffic. In other words, supervisory device 304 may be able to determine the traffic type for node 306 when node 306 first joins the network.

In further embodiments, supervisory device 304 may rely on traffic inspection techniques, to determine the traffic type for node 306. For example, after node 306 has been admitted to the network, supervisory device 304 may base the traffic type determination on an application identifying mechanism in the network such as Network Based Application Recognition (NBAR) from Cisco Systems, Inc., analysis of IPFIX or Netflow records, performing deep packet inspection (DPI) on the traffic of node 306, or the like. Any or all of these approaches may be performed on the APs 302 near node 306, by supervisory device 304, or both. In some cases, the permissions of node 306 in the network may also be limited until its traffic type is more definitively determined.

With the techniques herein, a channel plan is setup whereby channels are dedicated for different types of traffic, e.g., by policy or selected by learning machines, according to various embodiments. For example, as shown in FIG. 6A, supervisory device 304 may determine the type of traffic associated with node 306 and, based on this determination, assign a wireless channel to the VAP for node 306.

Figure 6B:
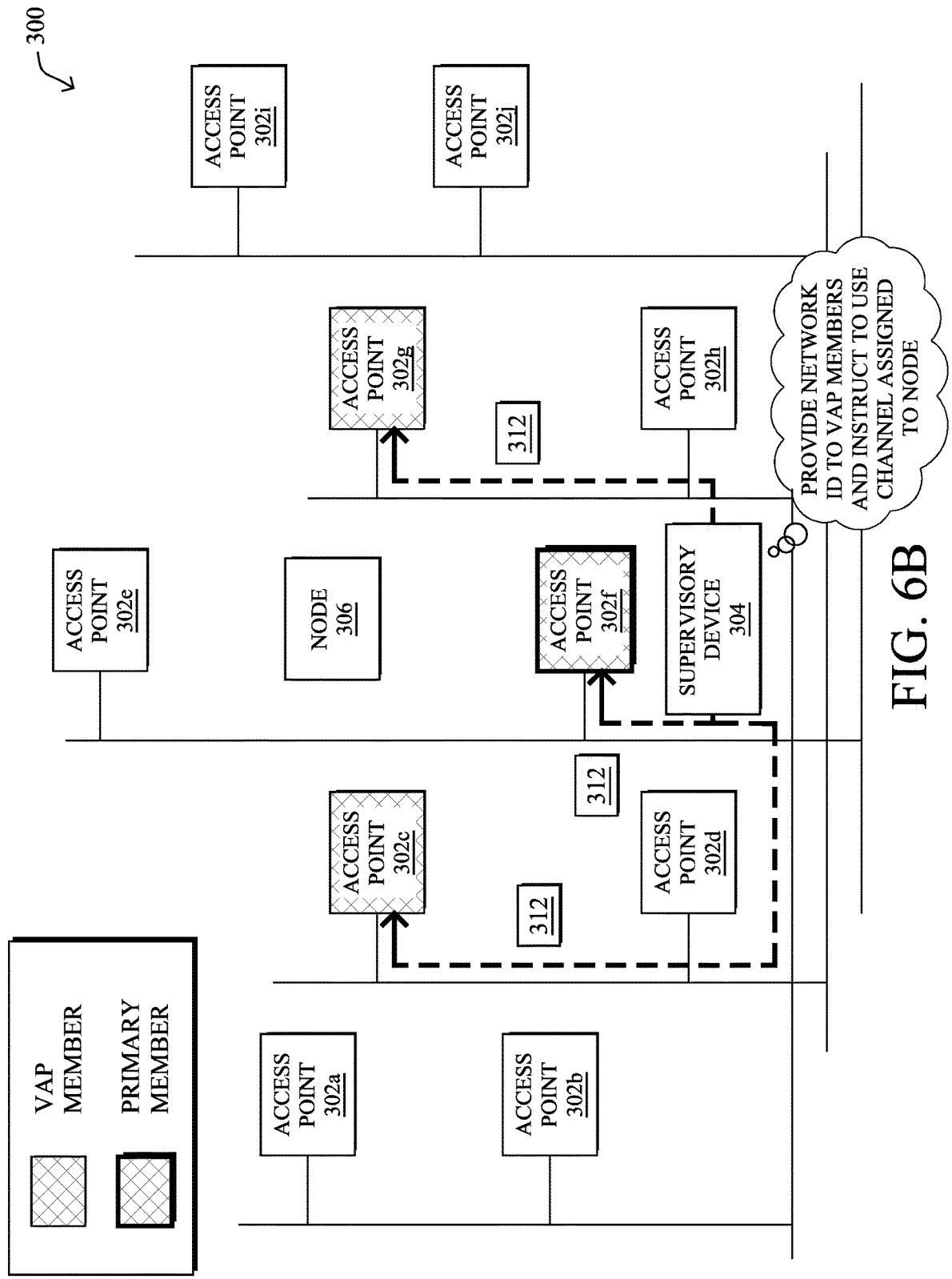

As noted above, supervisory device 304 may assign a unique SSID, PAN-ID, or other network identifier to node 306 and its corresponding VAP. Correspondingly, supervisory device 304 may assign the determined channel to this network identifier for use by the APs selected for the VAP mapping. During operation, the channel assignment can be adjusted by moving the SSID or other network identifier to another channel, thereby causing the node looking for that SSID or other identifier to roam to the selected channel. As shown in FIG. 6B, for example, instructions 312 sent by supervisory device 304 to selected APs 302 to configure the VAP for node 306 may further include the selected channel to be used with the unique network identifier for node 306. In addition, once the traffic type has been determined for node 306, supervisory device 304 may send a customized VAP protocol command message to the LM, in order to indicate the traffic type expected/detected by the AP(s) 302 and/or supervisory device 304 for the given node 306.

Said differently, unique SSIDs or other network identifiers are given to each node using unicast responses to broadcast. By moving the SSID, etc., to VAP that are on different frequencies, the LM can controls which nodes/devices talks on the various channels/frequencies in the network.

In some embodiments, when the decision is made to move node 306 to another channel based on its traffic and/or that of its peers versus that of the channel plan, supervisory device 304 may define a new VAP or VAP mapping using APs that listen on the new channel, and tells them to expect the node and the SSID or other network identifier that was given to node 306.

When the node scans that channel, APs then answer to the request that matches the expected SSID or other network identifier assigned to the node. It can also be noted that other techniques could be based on MAC addresses but this approach would be defeated by privacy MAC techniques whereby the MAC address is renewed when scanning.

The techniques herein enable the LMs to assign an end node to the channel that matches its needs best or, alternatively, where the node will cause the minimal trouble to the flows of other devices operating on that channel as well.

In various embodiments, after initially assigning the traffic flows, VAPs, and/or nodes to specific channels, the LMs may decide to reassign the channels in a slightly different fashion, which may cause a certain degree of reorganization.

Finally, the LM may tolerate "harmless exceptions" that allow a node to operate in a non-optimal channel because the best channel is saturated, and the operation in the alternate is sufficiently harmless. The LMs may, for instance, decide that one voice transmission is harmless to OT control on a same channel, but that can become harmful if the number of voice flows exceed a certain threshold.

The techniques herein further introduce an arrangement whereby learning machines are continuously trained with direct feedback from the control applications, which monitor whether the one or more service level agreements (SLAs) (e.g., in terms of delivery ratio, jitter, max latency, etc.) is met or not.

As pointed out, one goal of the techniques herein is to determine how heterogeneous traffic may advantageously be grouped on a given channel using machine learning, and then make use of unique SSIDs or other network identifiers to each node according to their traffic type. To that end, ML regression approaches such as a Gradient Boosted Tree or an ANN may be trained. With such ML-based approaches, obtaining a large number of labels is critical. Input features for the ML process may, for example, be the application/traffic type with a ratio for the given traffic (% of voice, % of video, % of deterministic IOT traffic, etc.). The techniques herein introduce an approach where labels are automatically obtained from external source in charge of SLA monitoring. For example, a mean opinion score (MOS)

metric for video may be automatically generated provided by either the node or the AP itself.

In some implementations, the basic processing steps may be as follows:

1.) Upon detecting the node and traffic type potentially generated by the node, the LM determines an optimum grouping of nodes per channel.
2.) The VAP is calculated, and provided back to the APs, which moves the SSID to the given VAP.
3.) SLA probes are then used to monitor the traffic SLA. For example, in the case of voice or video, MOS could be computed by the node or the AP and then be provided to the LM. Other active and passive probing may also be used to assess the SLA. Such stats reports are provided by the AP and/or supervisory device to the LM using a custom VAP protocol message.
4.) Upon receiving such evaluations of the SLA, the LM constantly retrains the corresponding regression models with new labels.

Figure 7A:
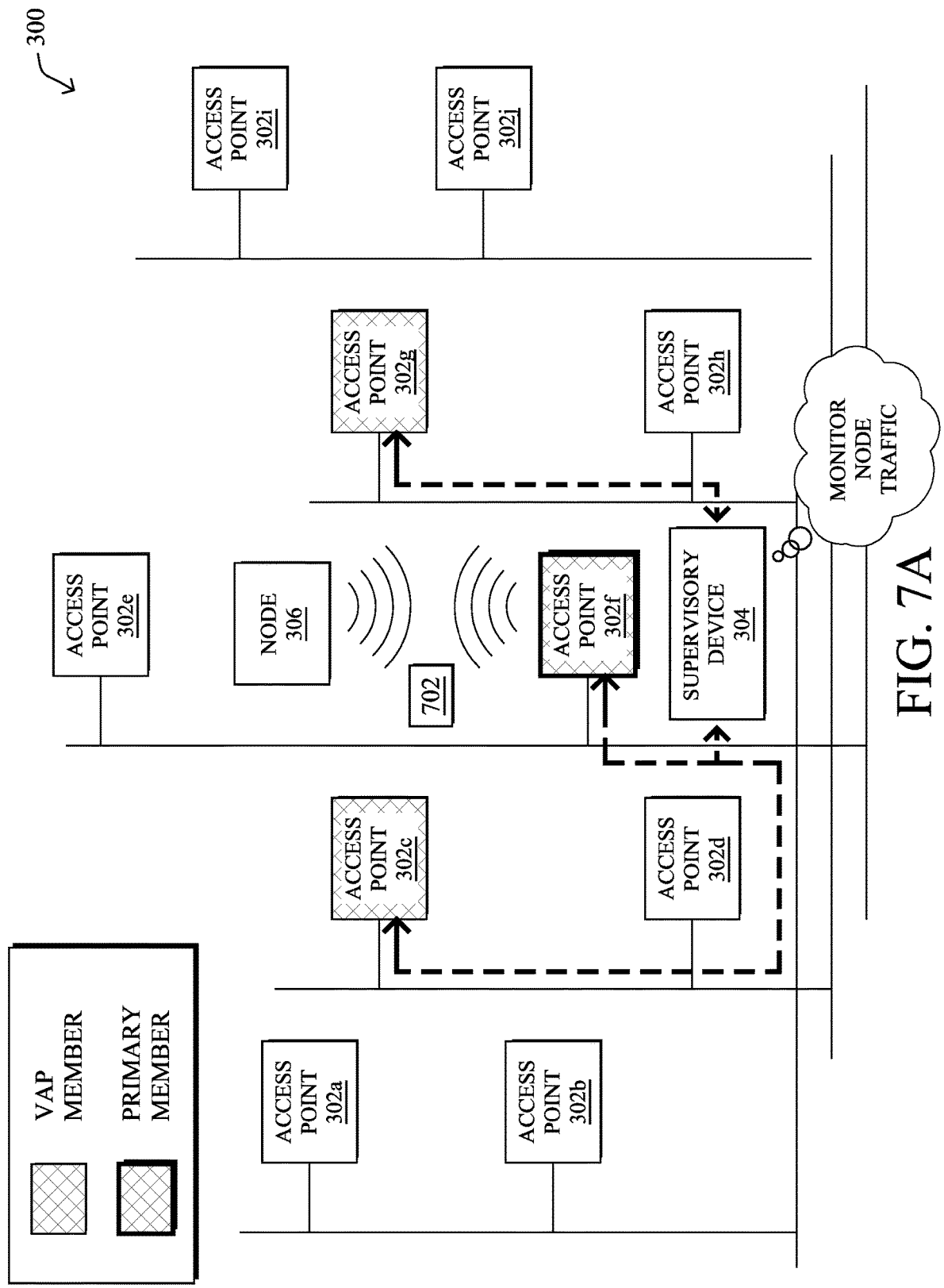
FIGS. 7A-7C illustrate an example of controlling channel assignments.
Figure 7B:
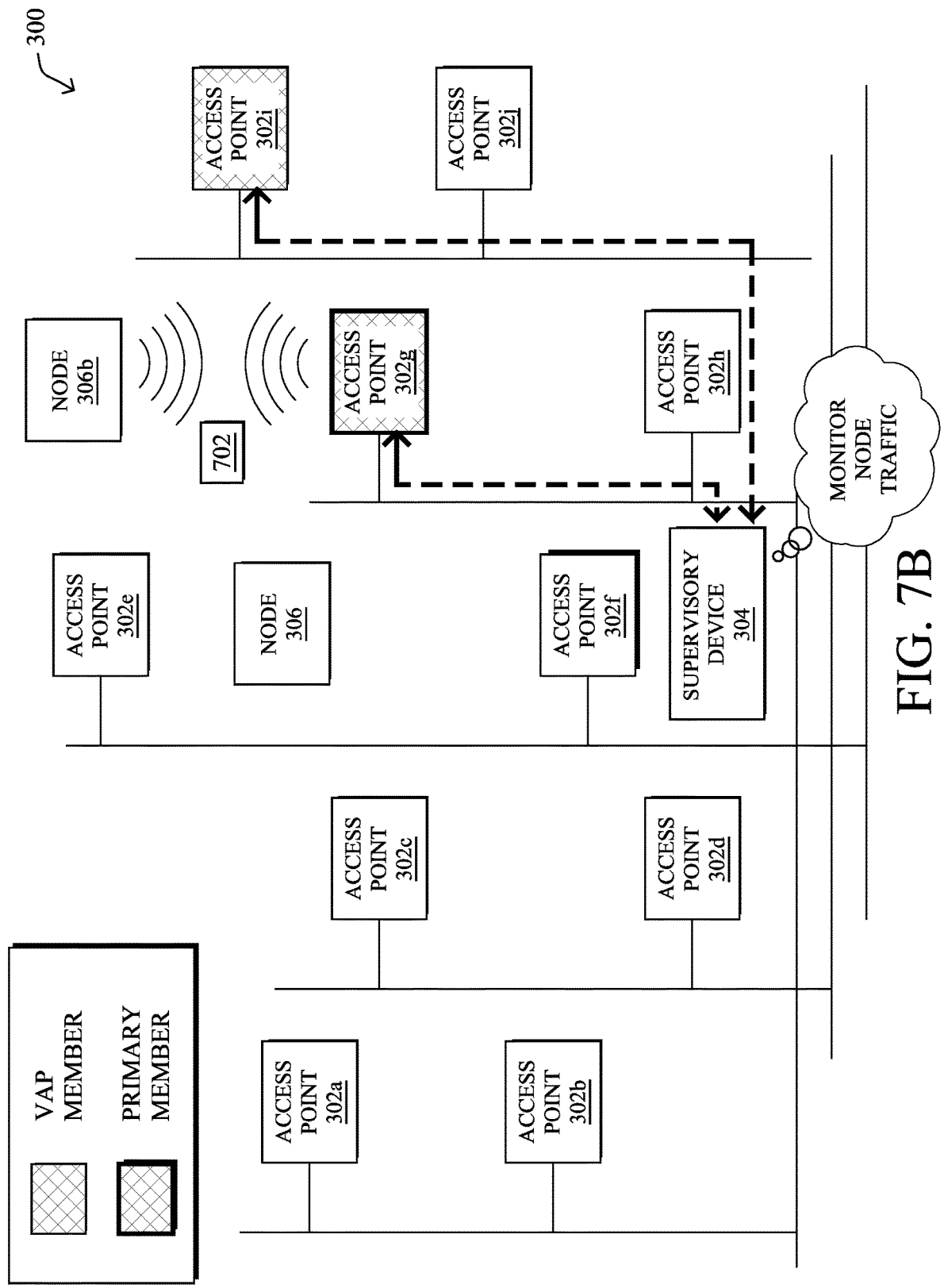
Figure 7C:
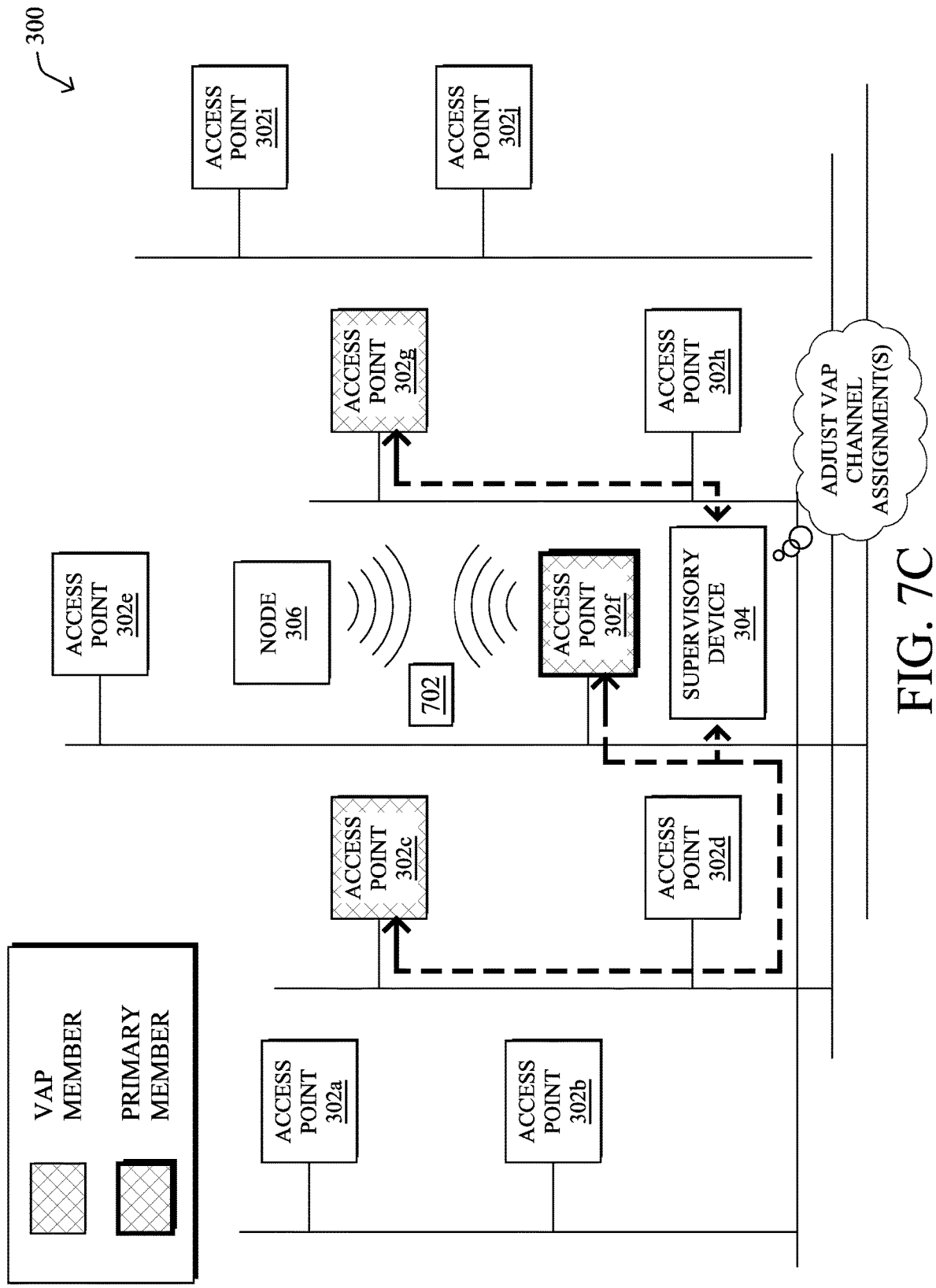

FIGS. 7A-7C illustrate an example of controlling channel assignments, according to various embodiments. In FIG. 7A, assume that node 306 has been assigned to a VAP that includes APs 302c, 302f, and 302g which operate on a channel selected based in part on the type of traffic 702 associated with node 306. In such a case, supervisory device 304 may monitor the node traffic to ensure that any SLAs for the traffic are being met. For example, supervisory device 304 may leverage SLA probing techniques, to determine the amount of loss, jitter, latency, etc., of traffic 702 sent to and/or from node 306.

In FIG. 7B, now consider the case of a second node 306b that is also in the network. Similar to node 306, node 306b may be assigned to its own VAP by supervisory device 304. However, the VAP of node 306b may include mapped APs 302g, the primary AP, and AP 302i, both of which may be on a channel selected by supervisory device 304 based on the type of traffic 704 associated with node 306b. Thus, AP 302g may be mapped to both the VAPs of node 306 and node 306b.

For purposes of illustration, now assume that traffic 702 associated with node 306 and traffic 704 are of different types. For example, assume that traffic 702 is interactive traffic whereas traffic 704 comprises a video stream. Accordingly, traffic 702 and 704 may have different SLA requirements. As shown in FIG. 7C, at some point in time, the LM overseeing the VAPs may determine that the VAP channel assignments for the VAPs of nodes 306 and 306a should be adjusted. Such an adjustment may also necessitate adjusting the APs that are mapped to any given VAP, in some cases. Generally, the LM may reconsider channel (re)allocation in a number of circumstances:

1.) The regression ML process has been retrained;
2.) Stats reports shows that the SLA for a given traffic flow or type is no longer being met; or
3.) New application breakdown is detected for a given node (e.g., node 306 suddenly starts generating or receiving a new type of traffic).

Thus, the channel selection may be performed not only when a node first joins the network via a VAP, but may be adjusted as needed over time as the network conditions and operations change.

Figure 8:
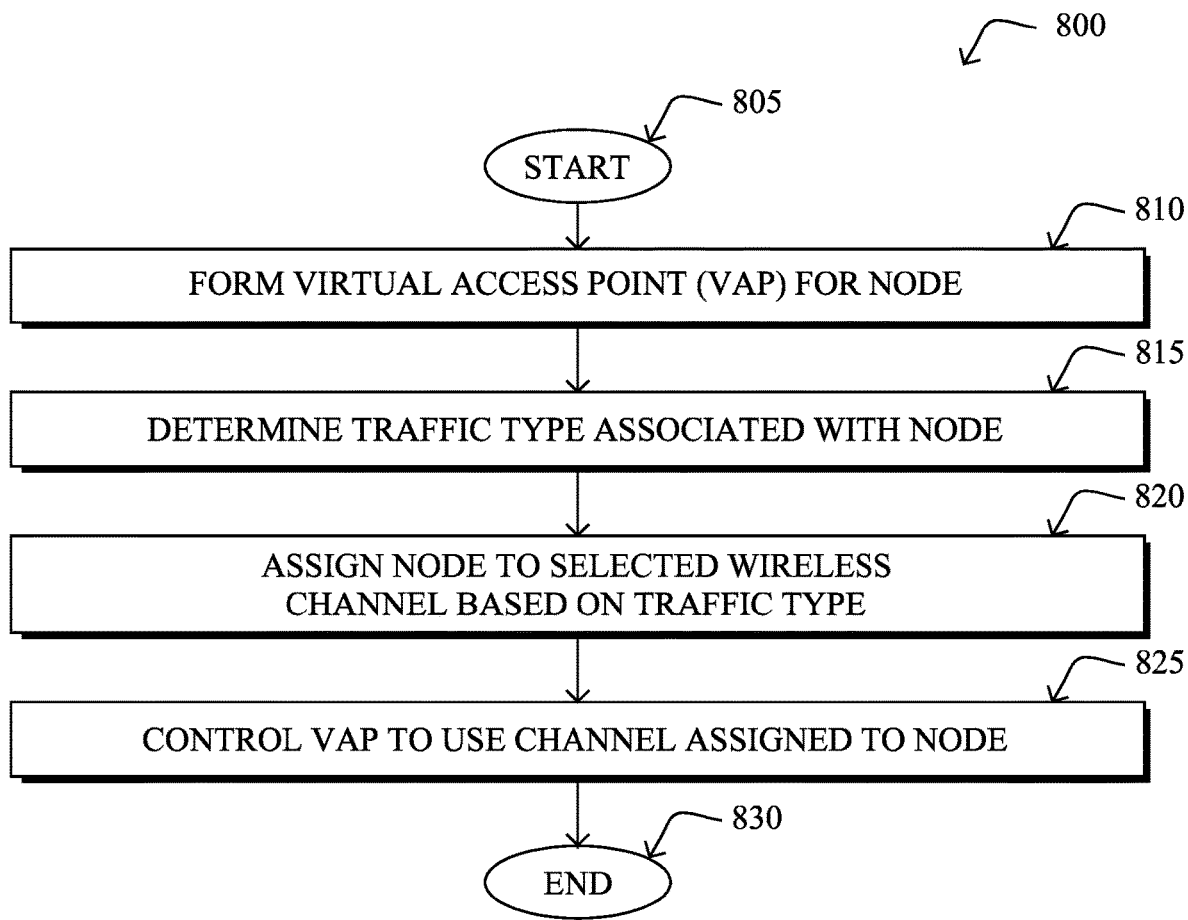
FIG. 8 illustrates an example simplified procedure for performing channel selection in VAP-enabled networks.

FIG. 8 illustrates an example simplified procedure for managing data traffic in a VAP, according to various embodiments. For example, a non-generic, specifically configured device (e.g., device 200) may perform procedure 800 by executing stored instructions (e.g., process 248). Such a device may be, in some embodiments, a supervisory device such as a wireless controller in the network that oversees a plurality of APs in the network or, in further embodiments, a collection of one or more APs. The procedure 800 may start at step 805 and continue on to step 810 where, as described in greater detail above, the device may form a virtual access point (VAP) in the network for the node. A plurality of access points (APs) in the network are mapped to the VAP and the APs in the VAP mapping are treated as a single AP by the node for communicating with the network.

At step 815, as detailed above, the device may determine a traffic type associated with the node. In some embodiments, the traffic type may be based on information known about the node itself such as the type of node, the manufacturer and/or model of the node, etc. For example, if the node is a video camera, the device may determine that the traffic associated with the node will include video traffic. In some embodiments, the device may receive data about the node from a network policy server or identity services engine. By leveraging information known about the node itself, its traffic type can be inferred, even when the node first joins the network. In further embodiments, the device may base the traffic type determination on an inspection of the traffic. For example, once the node is part of the network, its traffic type can be determined through inspection of the traffic itself using NBAR or similar mechanisms, DPI, or the like.

At step 820, the device may assign the node to a selected wireless channel based on its determined traffic type, as described in greater detail above. In various embodiments, the device may maintain a channel plan that assigns nodes and their corresponding traffic types to different wireless channels used in the network. For example, any given channel may be assigned a certain percentage of voice traffic, a certain percentage of video traffic, etc. In another example, control traffic may receive its own channel or share the channel with only a limited amount of other traffic. In some embodiments, the device may also consider the SLA requirements for the traffic type of the traffic associated with the node, when selecting a channel and/or reassigning a channel. In other words, the device may attempt to form an optimal set of channel assignments for the nodes and their corresponding VAPs, to ensure that the performance needs of their different traffic types are met. Such an optimization may be rule-based or, in further embodiments, controlled using a machine learning process (e.g., regression model, etc.) that monitors the SLAs over time and makes adjustments as necessary.

At step 825, as detailed above, the device may control the VAP to use the selected channel assigned to the node. In various embodiments, the device may send an instruction to the APs in the VAP mapping for the VAP of the node that includes an indication of the assigned channel. In turn, the APs may use this channel to communicate with the node. For example, in some embodiments, the device may uniquely assign an SSID, PAN-ID, or other network identifier to the node for use when accessing the network via the VAP. In turn, the device may instruct the APs to use this network identifier on a given channel, thereby causing the node to roam to the assigned channel and access the VAP using this channel. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide optimized channel selection for a virtual access point (VAP) protocol. In particular, the techniques herein, optimize the attribution of devices on channels and VAPs, thus minimizing harmful co-channel interferences and improving determinism for critical flows. The techniques herein also allow optimizing the spectrum utilization.

While there have been shown and described illustrative embodiments that provide techniques related to virtual access points (VAPs), it is to be understood that various other adaptations and modifications may be made within the spirit and scope of the embodiments herein. For example, while certain embodiments are described herein with respect to using certain environments, such as the IoT, other embodiments need not be limited to IoT devices. In addition, while certain protocols are shown, such as Wi-Fi, 802.15.4, LoRa, etc., other suitable protocols may be used, accordingly. For instance, while the techniques herein generally apply to a generalized CSMA/CA LLN, it should be specifically noted that the techniques can be applied to (based on) any of the standards mentioned above or known in the art. For ease of understanding (expecting the reader to be more familiar with the Wi-Fi parlance), the description above uses the term AP in the more general sense of a transceiver in a network. However, with Bluetooth LE, the central role illustratively maps to an AP, whereas the peripheral role is akin to the endpoint node. The same goes for the 802.15.4 PAN coordinator which is similar to an AP, and the full-function device (FFD) or reduced-function device (RFD) which illustratively map to an endpoint node, when 802.15.4 is used in plain hub-and-spoke (in that case a PAN ID illustratively serves as SSID). With DECT-ULE, the DECT Fixed Part is illustratively the AP, and the Portable Part is illustratively the node.

Note that some protocols on Wi-Fi networking refer to a "virtual access point" as many different things. For example, hosting several logical APs in one physical AP may be referred to as a "virtual access point", while turning a PC into an AP may also be referred to as a "virtual access point". The VAPs in this present disclosure should not be confused with the shared terminology, and is completely different in that one VAP herein is distributed over multiple physical APs, and there can be one VAP per node/STA.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    forming, by a supervisory device in a network, a virtual access point (VAP) that is uniquely associated with a node among nodes in the network, wherein a plurality of access points (APs) in the network are mapped to the VAP as part of a VAP mapping, and wherein the node treats the APs in the VAP mapping as a single AP for purposes of communicating with the network;
    determining, by the supervisory device, a traffic type of traffic associated with the node;
    optimizing, by the supervisory device and based on a machine learning model, a channel plan that assigns the nodes in the network to different channels based on their associated traffic types;
    assigning, by the supervisory device, the node to a selected wireless channel according to the optimized channel plan; and
    controlling, by the supervisory device, the VAP to use the channel assigned to the node in the optimized channel plan.

2. The method as in claim 1, wherein the VAP is associated with a service set identifier (SSID) or personal area network identifier (PAN-ID) uniquely assigned to the node.

3. The method as in claim 2, wherein controlling the VAP to use the channel assigned to the node comprises:
    instructing, by the supervisory device, the plurality of APs in the VAP mapping to use the selected wireless channel for the SSID or PAN-ID assigned to the node.

4. The method as in claim 1, wherein optimizing the channel plan based on the machine learning model comprises:
    monitoring service level agreements for the traffic types; and
    using machine learning to assign the nodes in the network to different channels to ensure the monitored service level agreements for the traffic types are met.

5. The method as in claim 1, wherein optimizing the channel plan comprises:
    determining that the selected wireless channel for the node is not the optimal channel for the traffic type of the traffic associated with the node; and
    allowing the node to operate on the selected wireless channel when the optimal channel for the traffic type is saturated.

6. The method as in claim 1, wherein the traffic type of the traffic associated with the node is determined based on at least one of: data from a policy server regarding the node, data from a security engine regarding the node, or an inspection of the traffic associated with the node.

7. The method as in claim 1, wherein controlling the VAP to use the channel assigned to the node comprises:
    adjusting, by the supervisory device, which APs are in the VAP mapping.

8. The method as in claim 1, wherein the supervisory device is a wireless controller in the network.

9. An apparatus, comprising:
    one or more network interfaces to communicate with a network;
    a processor coupled to the network interfaces and configured to execute one or more processes; and
    a memory configured to store a process executable by the processor, the process when executed operable to:
        form a virtual access point (VAP) that is uniquely associated with a node among nodes in the network, wherein a plurality of access points (APs) in the network are mapped to the VAP as part of a VAP mapping, and wherein the node treats the APs in the VAP mapping as a single AP for purposes of communicating with the network;
        determine a traffic type of traffic associated with the node;

optimize, based on a machine learning model, a channel plan that assigns the nodes in the network to different channels based on their associated traffic types;
assign the node to a selected wireless channel according to the optimized channel plan; and
control the VAP to use the channel assigned to the node in the optimized channel plan.

10. The apparatus as in claim 9, wherein the VAP is associated with a service set identifier (SSID) or personal area network identifier (PAN-ID) uniquely assigned to the node.

11. The apparatus as in claim 10, wherein the apparatus controls the VAP to use the channel assigned to the node by:
instructing the plurality of APs in the VAP mapping to use the selected wireless channel for the SSID or PAN-ID assigned to the node.

12. The apparatus as in claim 9, wherein the apparatus optimizes the channel plan based on the machine learning model by:
monitoring service level agreements for the traffic types; and
using machine learning to assign the nodes in the network to different channels to ensure the monitored service level agreements for the traffic types are met.

13. The apparatus as in claim 9, wherein the apparatus optimizes the channel plan by:
determining that the selected wireless channel for the node is not the optimal channel for the traffic type of the traffic associated with the node; and
allowing the node to operate on the selected wireless channel when the optimal channel for the traffic type is saturated.

14. The apparatus as in claim 9, wherein the traffic type of the traffic associated with the node is determined based on at least one of: data from a policy server regarding the node, data from a security engine regarding the node, or an inspection of the traffic associated with the node.

15. The apparatus as in claim 9, wherein the apparatus controls the VAP to use the channel assigned to the node by:
adjusting which APs are in the VAP mapping.

16. The apparatus as in claim 9, wherein the apparatus is a wireless controller in the network.

17. A tangible, non-transitory, computer-readable medium storing program instructions that cause a supervisory device in a network to execute a process comprising:
forming, by the supervisory device, a virtual access point (VAP) that is uniquely associated with a node among nodes in the network, wherein a plurality of access points (APs) in the network are mapped to the VAP as part of a VAP mapping, and wherein the node treats the APs in the VAP mapping as a single AP for purposes of communicating with the network;
determining, by the supervisory device, a traffic type of traffic associated with the node;
optimizing, by the supervisory device and based on a machine learning model, a channel plan that assigns the nodes in the network to different channels based on their associated traffic types;
assigning, by the supervisory device, the node to a selected wireless channel according to the optimized channel plan; and
controlling, by the supervisory device, the VAP to use the channel assigned to the node in the optimized channel plan.

18. The tangible, non-transitory, computer-readable medium as in claim 17, wherein optimizing the channel plan based on the machine learning model comprises:
monitoring service level agreements for the traffic types; and
using machine learning to assign the nodes in the network to different channels to ensure the monitored service level agreements for the traffic types are met.

19. The tangible, non-transitory, computer-readable medium as in claim 17, wherein optimizing the channel plan comprises:
determining that the selected wireless channel for the node is not the optimal channel for the traffic type of the traffic associated with the node; and
allowing the node to operate on the selected wireless channel when the optimal channel for the traffic type is saturated.

20. The tangible, non-transitory, computer-readable medium as in claim 17, wherein the VAP is associated with a service set identifier (SSID) or personal area network identifier (PAN-ID) uniquely assigned to the node.

* * * * *